US010351092B2

(12) United States Patent
Taguchi et al.

(10) Patent No.: US 10,351,092 B2
(45) Date of Patent: Jul. 16, 2019

(54) AIRBAG APPARATUS

(71) Applicant: AUTOLIV DEVELOPMENT AB, Vargarda (SE)

(72) Inventors: Hiroyuki Taguchi, Yokohama (JP); Yutaka Nakajima, Yokohama (JP); Hideho Fukuda, Yokohama (JP); Mitsuo Nogami, Yokohama (JP); Yuto Kobayashi, Yokohama (JP); Makoto Fuma, Yokohama (JP)

(73) Assignee: AUTOLIV DEVELOPMENT AB, Vargarda (SE)

(*) Notice: Subject to any disclaimer, the term of this patent is extended or adjusted under 35 U.S.C. 154(b) by 9 days.

(21) Appl. No.: 15/556,040

(22) PCT Filed: Feb. 3, 2016

(86) PCT No.: PCT/JP2016/053264
§ 371 (c)(1),
(2) Date: Sep. 6, 2017

(87) PCT Pub. No.: WO2016/143421
PCT Pub. Date: Sep. 15, 2016

(65) Prior Publication Data
US 2018/0043853 A1 Feb. 15, 2018

(30) Foreign Application Priority Data
Mar. 6, 2015 (JP) .................. 2015-044302

(51) Int. Cl.
*B60R 21/00* (2006.01)
*B60R 21/20* (2011.01)
(Continued)

(52) U.S. Cl.
CPC ........ *B60R 21/23138* (2013.01); *B60R 21/20* (2013.01); *B60R 21/231* (2013.01);
(Continued)

(58) Field of Classification Search
CPC . B60R 21/23138; B60R 21/231; B60R 21/20; B60R 2021/23161;
(Continued)

(56) References Cited

U.S. PATENT DOCUMENTS 5,172,790 A * 12/1992 Ishikawa ................. B60R 21/20
180/268
6,966,576 B1 * 11/2005 Greenstein ........ B60R 21/23138
280/730.1
(Continued)

FOREIGN PATENT DOCUMENTS

CN 101801733 A 8/2010
JP 2008-114713 A 5/2008
(Continued)

OTHER PUBLICATIONS

International Search Report of PCT/JP2016/053264 dated Apr. 12, 2016.

*Primary Examiner* — Drew J Brown
(74) *Attorney, Agent, or Firm* — Brinks Gilson & Lione

(57) ABSTRACT

An airbag apparatus capable of protecting an occupant by restraining movement of the occupant in an obliquely forward direction and towards a far side during a collision. A far side airbag apparatus (102), which is an airbag apparatus, deploys between a driver seat (106) and a front passenger seat (108) arranged side by side in a vehicle width direction of a vehicle cabin (100). The apparatus (102) includes a cushion (120) which is embedded in a floor of the vehicle cabin (100) and reaches a height at least equal to that of a pelvis region (160) of an occupant (156) seated in either one of the driver seat (106) and the front passenger seat (108) during inflation and deployment.

9 Claims, 7 Drawing Sheets

(51) Int. Cl.
*B60R 21/231* (2011.01)
*B60R 21/235* (2006.01)

(52) U.S. Cl.
CPC ............. *B60R 2021/0048* (2013.01); *B60R 2021/0055* (2013.01); *B60R 2021/0058* (2013.01); *B60R 2021/23161* (2013.01); *B60R 2021/23547* (2013.01)

(58) Field of Classification Search
CPC .... B60R 2021/0048; B60R 2021/0058; B60R 2021/0055; B60R 2021/23547
See application file for complete search history.

(56) References Cited

U.S. PATENT DOCUMENTS

| | | | |
|---|---|---|---|
| 7,976,058 B2 | 7/2011 | Suzuki et al. | |
| 8,267,424 B2 | 9/2012 | Tomitaka et al. | |
| 8,414,018 B2* | 4/2013 | Choi | B60R 21/23138 280/729 |
| 2009/0243268 A1 | 10/2009 | Suzuki et al. | |
| 2010/0264631 A1 | 10/2010 | Tomitaka et al. | |
| 2010/0295280 A1* | 11/2010 | Tomitaka | B60R 21/23138 280/730.1 |
| 2014/0151984 A1* | 6/2014 | Fukawatase | B60R 21/233 280/730.2 |
| 2015/0197209 A1* | 7/2015 | Fujiwara | B60R 21/231 280/730.1 |
| 2016/0159307 A1* | 6/2016 | Fujiwara | B60R 21/207 280/729 |
| 2018/0222433 A1* | 8/2018 | Byun | B60R 21/207 |

FOREIGN PATENT DOCUMENTS

| | | |
|---|---|---|
| JP | 2008-126783 A | 6/2008 |
| JP | 2008-155904 A | 7/2008 |
| JP | 2009-234538 A | 10/2009 |
| JP | 2010-143233 A | 7/2010 |
| JP | 2011-046308 A | 3/2011 |
| JP | 2011-116153 A | 6/2011 |
| JP | 2015-009675 A | 1/2015 |
| WO | WO 2009/035115 A1 | 3/2009 |

* cited by examiner

VIEWED FROM ARROW A

AIRBAG APPARATUS

CROSS-REFERENCE TO RELATED APPLICATIONS

This application is a 35 U.S.C. § 371 national phase application of International Application No.: PCT/JP2016/053264, filed Feb. 3, 2016, which claims the benefit of priority under 35 U.S.C. § 119 to Japanese Patent Application No.: 2015-044302, filed Mar. 6, 2015, the contents of which are incorporated herein by reference in their entirety.

FIELD OF THE INVENTION

The present invention relates to an airbag apparatus for a motor vehicle provided with a cushion that inflates and deploys so as to protect an occupant when an impact occurs in a vehicle due to an accidental collision or the like.

BACKGROUND

When a vehicle is collided with from the side (hereinafter referred to as a "side collision" or "side impact"), or from the front (hereinafter referred to as a "front collision" or "frontal impact"), an occupant tends to move in the direction of the collision (towards the side or towards the front) relative to the vehicle, due to inertia. In order to suppress such movement of the occupant in the direction of the collision, an airbag is installed in a center portion of a steering wheel in the case of a driver seat and in a front portion of the vehicle, such as above an instrument panel, in the case of a front passenger seat. Further, in order to reliably suppress movement of the occupant in the direction of a side collision, a curtain airbag apparatus is installed in a side portion of the vehicle and/or a side airbag is installed inside a seat, etc.

Further, on considering side collisions from the perspective of the occupant, there are two types of collision, i.e. a collision from a side close to oneself (a near side) and a collision from a side further from oneself (a far side). In the case of a far side collision, for example, the occupant moves significantly towards the center of a vehicle width direction (the far side) due to inertia during the far side collision, such that there is a risk of the occupant colliding with an occupant in an adjacent seat or with a hard interior component inside a vehicle cabin.

On the assumption of such a situation, far side airbag apparatuses (vehicle occupant protection apparatuses) have been developed which deploy between two seats arranged side by side in a vehicle width direction, represented by a driver seat and a front passenger seat, of a vehicle cabin as disclosed in, for example, Japanese Patent Publication Nos. 2008-126783, 2008-155904, 2011-46308, and 2011-116153. A far side airbag apparatus causes a cushion to inflate and deploy in an upward direction from a center console between a driver seat and a front passenger seat, thereby protecting an occupant that has moved towards a far side.

However, depending on the circumstances of a collision, there are also cases in which an occupant moves towards a space between the airbag installed in the front portion of the vehicle and the curtain airbag installed in the side portion of the vehicle (in an obliquely forward direction). In such a case, the occupant may slip between the airbag installed in the front portion of the vehicle and the curtain airbag installed in the side portion of the vehicle due to there being nothing to restrain the occupant. As a result, there is concern that the occupant may collide with an interior component inside the vehicle.

Further, depending on the type of vehicle, there may not be a center console. In such a vehicle type, it is common for the vehicle cabin floor between the driver seat and the front passenger seat to form a passage on which an occupant can walk and move. However, as there is no center console, a far side airbag apparatus cannot be provided and, further, the pelvis region of an occupant cannot be restrained by the center console. As a result, a problem exists in that an amount of movement of the pelvis region of an occupant towards a far side during a collision is larger than in a vehicle which has a center console. There is, in this case also, concern that an occupant could collide with an interior component inside the vehicle or, further, collide with an occupant in an adjacent seat.

In view of such a problem, an object of the present invention is to provide an airbag apparatus that is capable of protecting an occupant by restraining movement of the occupant in an obliquely forward direction and towards a far side during a collision.

SUMMARY AND INTRODUCTORY DESCRIPTION OF THE INVENTION

In order to solve the abovementioned problem, the airbag apparatus according to the present invention has a representative configuration in which the airbag apparatus includes a cushion provided on or embedded in a floor of a vehicle cabin and reaching a height at least equal to that of a pelvis region of an occupant seated in a seat during inflation and deployment.

With such a configuration, as the cushion is provided on or embedded in the floor of the vehicle cabin, the cushion can be arranged obliquely forward of a seat on a vehicle outer side thereof and/or between two seats arranged side by side in a vehicle width direction of a vehicle cabin. In other words, with the present invention, although there are also cases in which a portion of the airbag cushion projects upward from the floor, the main portion or all of the airbag cushion is embedded beneath the floor. As a result, a space between an airbag installed in a front portion of a vehicle and a curtain airbag installed in a side portion of the vehicle can be filled with a cushion during a collision. Further, a space above a passage that exists between two seats arranged side by side in a vehicle width direction of the vehicle cabin can also be filled with a cushion during a collision. As a result, it is possible protect an occupant by restraining movement of the occupant in an obliquely forward direction and towards a far side during a collision.

It is preferable for the abovementioned airbag apparatus to be a far side airbag apparatus that deploys between two seats arranged side by side in a vehicle width direction of the vehicle cabin. With such a configuration, a space above a passage that exists between two seats arranged side by side in the vehicle width direction of the vehicle cabin can be filled with a cushion during a collision, such that movement towards a far side during a collision can be restrained and the occupant protected.

In particular, as the cushion reaches from beneath the floor or from the floor of the vehicle cabin to a height at least equal to that of a pelvis region of an occupant seated in either one of two seats during inflation and deployment, the cushion works in the same way as a center console to restrain the pelvis region of the occupant. Accordingly, an amount of movement of the pelvis region of the occupant in a vehicle width direction is suppressed, such that the occupant can be prevented from colliding with an occupant in an adjacent seat or with an interior component.

Further, as the airbag apparatus of the present invention is provided on or embedded in the floor of the vehicle cabin, the airbag apparatus can be provided, for example, not only between the driver seat and the front passenger seat, but also between rear seats. Accordingly, an amount of movement of a pelvis region of an occupant in a rear seat in a vehicle width direction can be suppressed, whereby safety can be further improved.

It is preferable for the abovementioned cushion to reach a height equal to that of a head of an occupant seated in either one of the two seats, and to include a first chamber which restrains the pelvis region of the occupant, and a second chamber which is formed above the first chamber and restrains the head of the occupant. With such a configuration, the head of the occupant can also be restrained due to the second chamber. Accordingly, it is possible to more reliably prevent an occupant from colliding with an occupant in an adjacent seat or with an interior component.

It is preferable for the abovementioned cushion to inflate and deploy so as to be sandwiched between respective seat cushions of the two seats. By employing such a configuration, the cushion can be inflated and deployed more stably.

It is preferable for the abovementioned airbag apparatus to include a first cushion which is provided on or embedded in the floor of the vehicle cabin and reaches a height at least equal to that of a pelvis region of an occupant seated in one of the two seats during inflation and deployment, and a second cushion which is provided on or embedded in the floor of the vehicle cabin so as to be adjacent to the first cushion in the vehicle width direction and reaches a height at least equal to that of a pelvis region of an occupant seated in the other of the two seats during inflation and deployment.

With such a configuration, a space above a passage that exists between two seats arranged side by side in a vehicle width direction of a vehicle cabin can be filled with the two cushions during a collision. In particular, as an opposite side of one of the cushions that restrains the pelvis region of the first occupant is supported by the other cushion, an amount of movement is suppressed in comparison to when a single cushion is used and the occupant is prevented from collapsing excessively towards a far side.

It is preferable for at least one of the first cushion and the second cushion to include a first chamber which restrains the pelvis region of the occupant, and a second chamber which is formed above the first chamber and restrains the head of the occupant, and to have a height that reaches a height equal to that of a head of an occupant seated in at least one of the two seats. With such a configuration, the head of the occupant can also be restrained due to the second chamber. Accordingly, the occupant can be further prevented from colliding with another occupant or with another object.

It is preferable for the first cushion and the second cushion to inflate and deploy so as to be sandwiched between respective seat cushions of the two seats. With such a configuration, the first cushion and the second cushion can be more stably inflated and deployed.

It is preferable for the abovementioned airbag apparatus to deploy on a vehicle outer side and obliquely forward of one of seats arranged side by side in the vehicle width direction of the vehicle cabin, and to inflate and deploy during a collision in which a force that causes the occupant to move in an obliquely forward direction is exerted. With such a configuration, movement of the occupant in the obliquely forward direction can be restrained during a collision in which a force that causes the occupant to move in the obliquely forward direction is exerted. In particular, as the airbag apparatus deploys on the vehicle outer side and obliquely forward of the seat, a space between an airbag installed in a front portion of the vehicle and a curtain airbag installed in a side portion of the vehicle can be filled with the cushion during a collision. As a result, during a collision in which a force that causes the occupant to move in the obliquely forward direction is exerted, movement of the occupant in the obliquely forward direction is restrained, such that the occupant can be prevented from slipping into the space between the airbag installed in the front portion of the vehicle and the curtain airbag installed in the side portion of the vehicle.

Further, as the airbag apparatus of the present invention is provided on or embedded in the floor of the vehicle cabin, the airbag apparatus can be provided, for example, not only obliquely forward of the driver sear and the front passenger seat on respective vehicle outer sides thereof, but also obliquely forward of the rear seats on respective vehicle outer sides thereof. As a result, movement of an occupant in a rear seat in an obliquely forward direction towards a vehicle outer side can be suppressed, such that collision of the occupant with the shoulder of a driver seat or a front passenger seat, for example, can be prevented.

It is preferable for the cushion of the abovementioned airbag apparatus to have a height that reaches a height equal to that of a head of the occupant seated in the seat. With such a configuration, movement of the occupant in an obliquely forward direction can be sufficiently restrained during a collision in which a force that causes the occupant to move in the obliquely forward direction is exerted. Further, a space between an airbag installed in a front portion of the vehicle and a curtain airbag installed in a side portion of the vehicle can be sufficiently filled with the cushion during a collision. As a result, safety can be further improved.

With the present invention, an occupant can be protected by retraining movement of the occupant in an obliquely forward direction and towards a far side during a collision.

DETAILED DESCRIPTION

Figure 1:
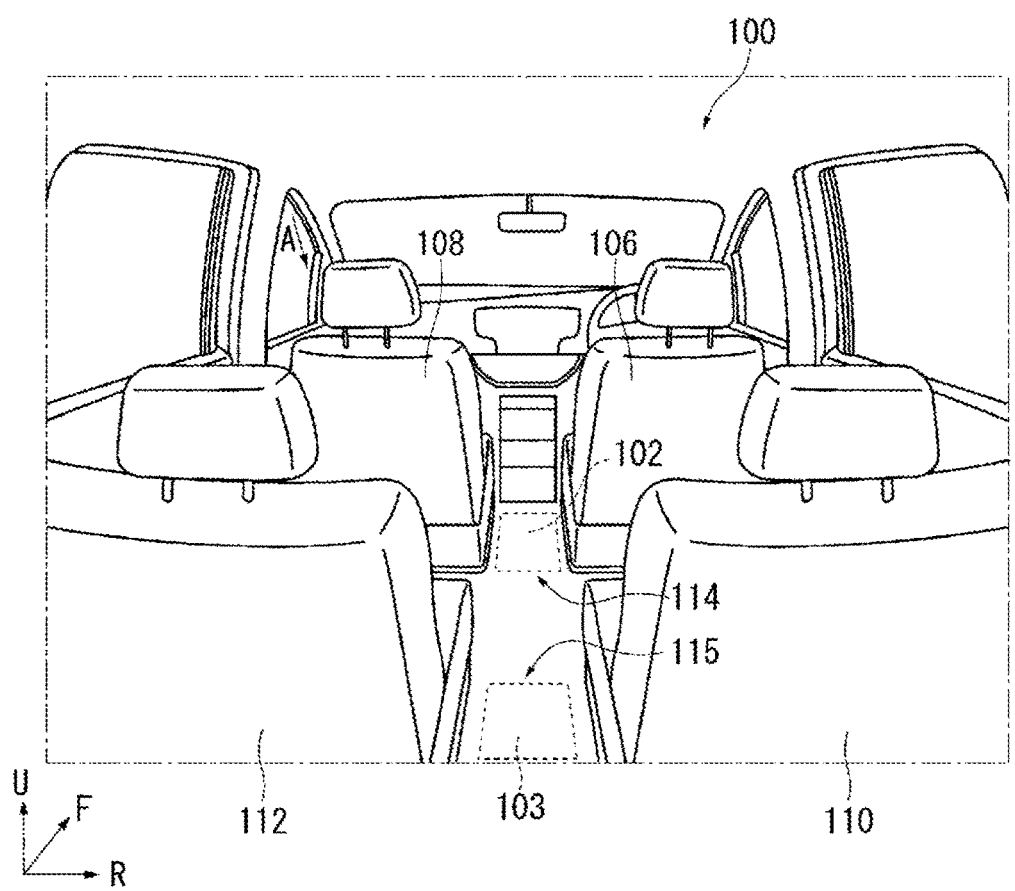
FIG. 1 is a diagram illustrating a vehicle cabin of a vehicle in which a first embodiment of an airbag apparatus according the present invention is implemented.

Preferred embodiments of the present invention will be described hereinafter in detail with reference to the accompanying drawings. Dimensions, materials, and other specific numerical values, etc., disclosed in the embodiments are merely examples which are provided to make the invention easier to understand and, unless indicated otherwise, do not limit the present invention. Note that in this description and in the drawings, elements which have a substantially identical function or structure will be denoted by identical reference numerals, thus eliminating redundant explanations, and illustration of elements that are not directly related to the present invention will be omitted. This description makes reference to an occupant or occupants seated in a vehicle. Such occupants are considered as representative occupants in terms of height, mass, and stature. As such, restraint characteristics for a specific potential occupant may differ from that intended for a representative occupant.

FIG. 1 is a diagram which illustrates a vehicle cabin 100 of a vehicle in which far side airbag apparatuses 102 and 103, that is, a first embodiment of the airbag apparatus according the present invention, are implemented. In FIG. 1, the vehicle is, for example, an SUV (Sport Utility Vehicle). A total of four seats, that is, two rows of two seats arranged in a vehicle width direction arranged in a vehicle longitudinal direction, or in other words, a driver seat 106, a front passenger seat 108, a first rear seat 110, and a second rear seat 112 are arranged in the vehicle cabin 100 of the vehicle. There is no center console between the driver seat 106 and the front passenger seat 108, and instead there is a passage 114 which can be walked on. Further, an area between the first rear seat 110 and the second rear seat 112 also forms a passage 115 which can be walked on. The passages 114 and 115 constitute the floor of the vehicle cabin 100 and, in the vehicle illustrated in FIG. 1, the floor surface in the vehicle cabin 100 is substantially flat. Hereinbelow, the arrows U, F, and R, which are shown in the drawings, indicate the top of the vehicle, the front of the vehicle, and the right side of the vehicle, respectively.

As is illustrated by the broken lines shown in FIG. 1, the far side airbag apparatuses 102 and 103 are respectively embedded beneath the floor in the passage 114 between the driver seat 106 and the front passenger seat 108 and in the passage 115 between the first rear seat 110 and the second rear seat 112. Accordingly, the main portion or all of a cushion 120 of the far side airbag apparatus 102 given as a representation and illustrated in FIG. 2 is embedded beneath the floor.

Note that, although not shown, the far side airbag apparatuses 102 and 103 may also be provided so that at least a portion thereof projects upward from the floor of the vehicle cabin 100.

As the far side airbag apparatuses 102 and 103 have a similar configuration and operation, the configuration and operation of the far side airbag apparatus 102 will be described below as a representation. FIG. 2 is a diagram which illustrates a state in which the far side airbag apparatus 102 shown in FIG. 1 is inflated and deployed. FIG. 2 illustrates a state in which the driver seat 106 and the front passenger seat 108 illustrated in FIG. 1 are viewed from the front of the vehicle.

Figure 2:
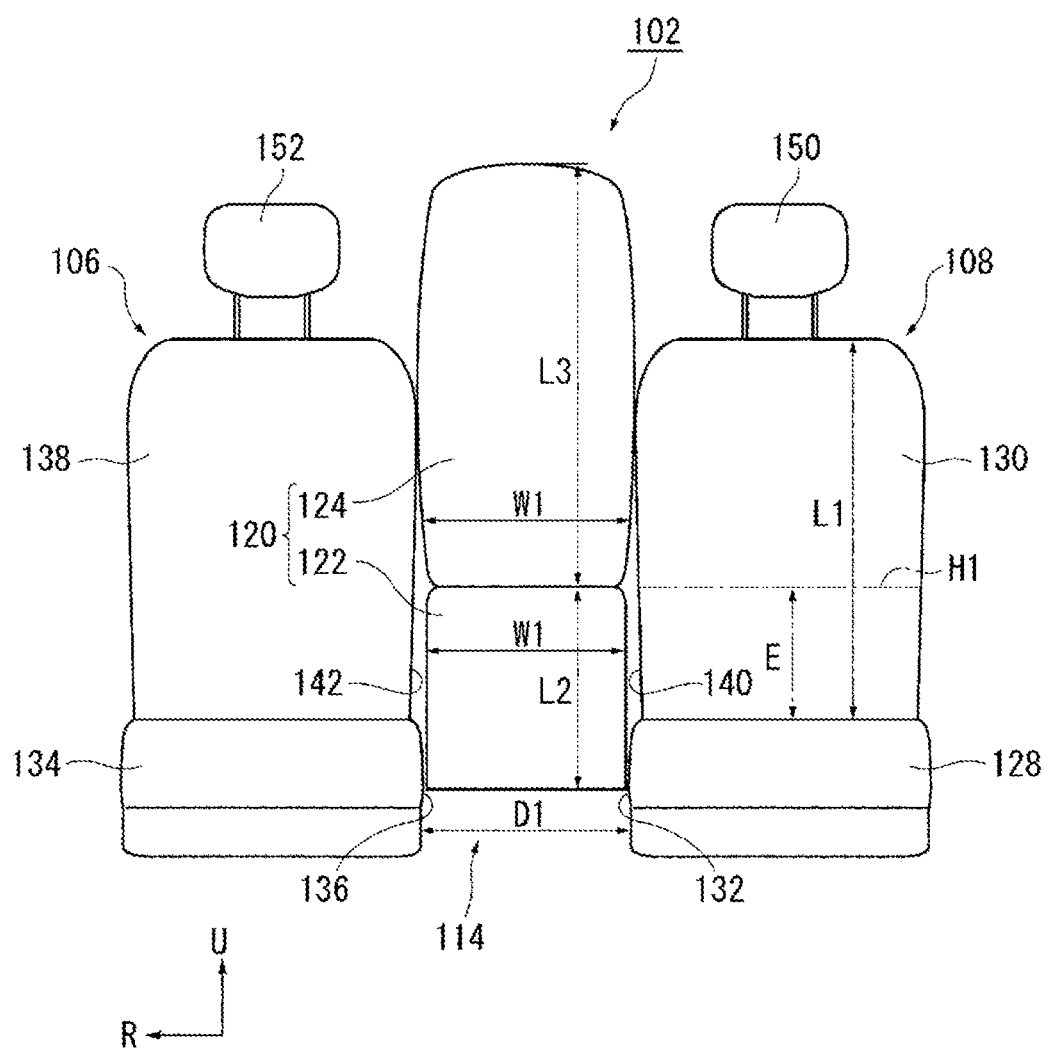
FIG. 2 is a diagram illustrating a state in which the far side airbag apparatus shown in FIG. 1 is inflated and deployed.

As illustrated in FIG. 2, the far side airbag apparatus 102 according to the first embodiment of the present invention includes one cushion 120 which, during an emergency, inflates and deploys in an upward direction from the passage 114, having previously been embedded therein. The cushion 120 is partitioned into a plurality of inflation chambers (chambers) in consideration of locations with which an occupant could come into contact. In the present embodiment, the cushion 120 is partitioned into a first chamber 122 and a second chamber 124.

As illustrated in FIG. 2, the first chamber 122 reaches a height H1 when inflated and deployed. The height H1 is a height which corresponds to about ⅓ of the vertical dimension L1 of the seat back 130 as measured from a seat surface (upper side) of the seat cushion 128 of the front passenger seat 108. Generally, when an occupant is seated in a seat such as the front passenger seat 108, the pelvis region (pelvis) of the occupant is in the range E which extends from the seat surface of the seat cushion 128 to the height H1. Accordingly, the first chamber 122 reaches a height at least about equal to that of a pelvis region 160 of an occupant 156 having moved towards a far side during a side collision, such that the pelvis region 160 can be securely restrained. As illustrated in FIG. 2, in the present embodiment, the first chamber 122 has, when inflated and deployed, a rectangular parallelepiped shape substantially similar to that of a center console. As illustrated in FIG. 2, the first chamber 122 has a vertical dimension L2, a width W1, and a depth (not shown).

The width W1 (the length in the vehicle width direction) of the first chamber 122 during inflation and deployment shown in FIG. 2 is equal to or less than a distance D1 between the two seats arranged side by side in the vehicle width direction. It is preferable that the width W1 is substantially equal to the distance D1. As a result, during inflation and deployment, a side surface 132 of the seat cushion 128 on a passage 114 side of the front passenger seat 108, that is, the first seat, and a side surface 136 of the seat cushion 134 on a passage 114 side of the driver seat 106, that is, the second seat, respectively abut the first chamber 122. In other words, as the first chamber 122 is inflated and deployed so as to be sandwiched between the seat cushions 128 and 134 of the two seats, the first chamber 122 can be stably inflated and deployed.

Figure 3:
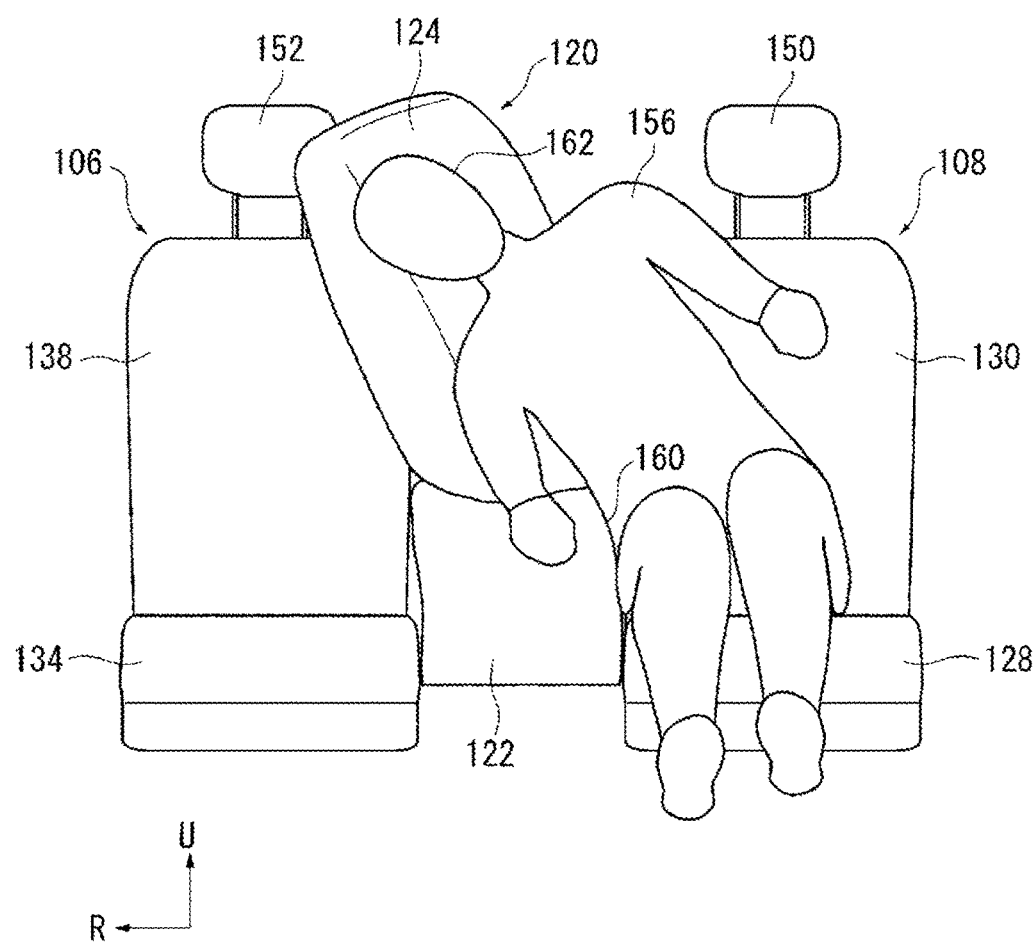
FIG. 3 is a diagram illustrating a state in which an occupant is restrained by the far side airbag apparatus shown in FIG. 2.

FIG. 3 is a diagram illustrating a state in which an occupant is being restrained by the far side airbag apparatus 102 shown in FIG. 2. FIG. 3 illustrates a state in which the occupant 156 seated in the front passenger seat 108 is restrained by the cushion 120. As already mentioned, the first chamber 122 has a rectangular parallelepiped shape substantially similar to that of a center console, hence, the passage 114 in which there is no center console can be filled with the first chamber 122 during a collision. As illustrated in FIG. 3, the pelvis region 160 of the occupant 156 is restrained by the first chamber 122, whereby the occupant 156 is prevented from colliding with an occupant in the adjacent seat or with interior components (the adjacent seat, etc.).

Note that, although not shown, it is preferable for the depth (the length in the vehicle longitudinal direction) of the first chamber 122 to be substantially the same length as the depth of the seat cushions 128 and 134 (the length from the front end to the rear end of the seat cushions 128 and 134). Due to such a configuration, the pelvis region 160 of the occupant 156 can be restrained when the occupant 156 is deeply seated in the seat, and also when the occupant 156 is shallowly seated in the seat.

It is even more preferable for the depth of the first chamber to extend towards the rear of the vehicle to such an extent that the first chamber 122 opposes the respective side surfaces 140 and 142 of the respective seat backs 130 and 138 of the two seats. Due to such a configuration, as illustrated in FIG. 3, even if the occupant 156 seated in the first seat leans against the cushion 120 during a collision, the first chamber 122 is supported by the side surface 142 of the seat back 138 of the second seat. Accordingly, the pelvis region 160 of the occupant 156 can be stably restrained by suppressing the amount of movement of the first chamber 122 towards an opposite side to the side from which the occupant 156 is leaning.

As illustrated in FIG. 2, the second chamber 124 is a portion formed above the first chamber 122. When inflated and deployed, the second chamber 124 reaches a height about at least equal to that of the headrests 150 and 152 (the portion on which the head 162 of the occupant 156 in FIG. 3 leans) of the seats. As illustrated in FIG. 2, in the present embodiment, the second chamber 124 is also has a rectangular parallelepiped shape similar to that of the first chamber 122, and the vertical dimension L3 of the second chamber 124 is approximately 2.5 times the vertical dimension L2 of the first chamber 122. Note that the second chamber 124 has a width W1 and a depth (not shown) similar to those of the first chamber 122. Accordingly, as illustrated in FIG. 3, the second chamber 124 is inflated and deployed so as to be sandwiched between the respective side surfaces 140 and 142 of the seat backs 130 and 138, thereby enabling stable restraint of the head of the occupant.

The shapes and dimensions of the first chamber 122 and the second chamber 124 are not limited to those shown in FIG. 2, and arbitrary shapes and dimensions may be adopted as long these shapes and dimensions are capable of restraining the pelvis region and the head of an occupant during a collision.

Each portion (the first chamber 122, the second chamber 124, etc.) of the cushion 120 can be formed as a bag shape (a bag-shape is used where ducts are present) by so-called cut and sew, i.e. in which two pieces of fabric (base fabric), i.e. inner and outer, are layered one on top of the other and sewn, adhered, or both, or by an OPW (One-Piece Woven) method.

Figure 4:
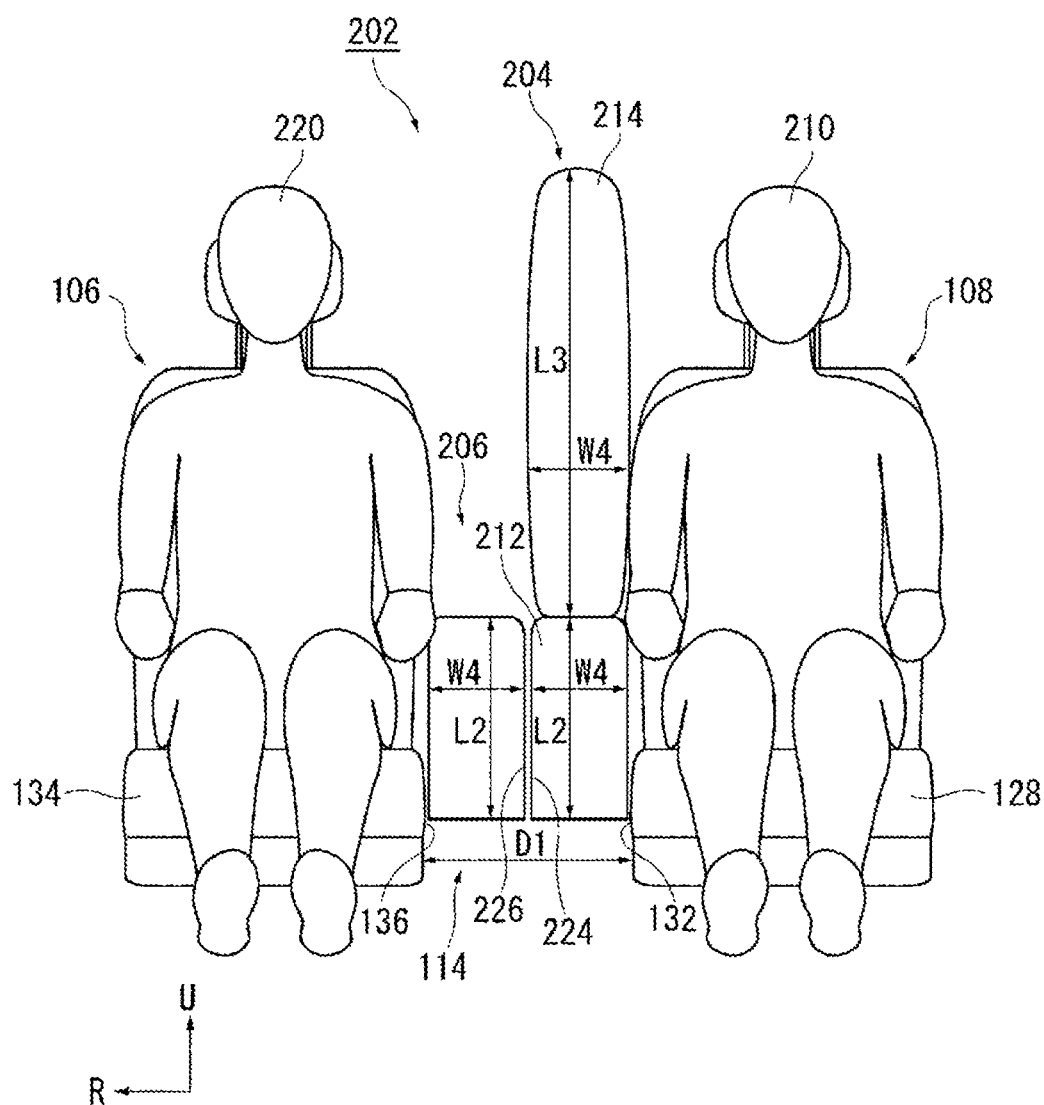
FIG. 4 is a diagram illustrating a state in which a second embodiment of the airbag apparatus according to the present invention is inflated and deployed.

FIG. 4 is a diagram which illustrates a state in which a far side airbag apparatus 202 according to a second embodiment of the airbag apparatus according to the present invention is inflated and deployed. The far side airbag apparatus 202, that is, the second embodiment, can be implemented in place of the far side airbag apparatus 102 shown in FIG. 1. In FIG. 4, elements similar to those of the first embodiment shown in FIG. 1 to FIG. 3 are denoted by the same reference numerals, and description thereof will be omitted.

As illustrated in FIG. 4, the far side airbag apparatus 202 includes two cushions, that is, a first cushion 204 arranged on the front passenger seat 108 side and a second cushion 206 arranged on the driver seat 106 side, such that the space between the driver seat 106 and the front passenger seat 108 is filled.

As illustrated in FIG. 4, the first cushion 204 has a first chamber 212 and a second chamber 214 similar to the cushion 120 shown in FIG. 2. During inflation and deployment, the first chamber 212 has a rectangular parallelepiped shape which is substantially similar to the shape obtained by dividing a center console in half along the vehicle longitudinal direction, and has a vertical dimension L2 and a length in the vehicle longitudinal direction (not shown) equal to those of the first chamber 122 shown in FIG. 2. Accordingly, the first chamber 212 is a portion that reaches a height at least equal to that of a pelvis region of an occupant 210 seated in the front passenger seat 108, and restrains at least the pelvis region of the occupant 210. The width W4 of the first chamber 212 during inflation and deployment is substantially ½ of the distance D1 between two seats arranged side by side in the vehicle width direction.

The second chamber 214 also has a substantially rectangular parallelepiped shape during inflation and deployment and has a vertical dimension L3 and a length in the vehicle longitudinal direction (not shown) about equal to those of the second chamber 124 shown in FIG. 2. Accordingly, the first cushion has a height that reaches a height about equal to that of a head of the occupant 210 seated in the front passenger seat 108, and the head of the occupant 210 seated in the front passenger seat 108 is restrained by the second chamber 214. Note that the second chamber 214 also has a width W4 which, during inflation and deployment, is substantially ½ of the distance D1.

The second cushion 206 is not divided into a plurality of chambers, has a rectangular parallelepiped shape substantially similar to that of the first chamber 212, and has a vertical dimension L2, a width W4, and a length in the vehicle longitudinal direction (not shown) similar to those of the first chamber 212. Accordingly, the second cushion 206 reaches, when inflated and deployed, a height at least equal to that of a pelvis region of an occupant 220 seated in the driver seat 106, so as to restrain at least the pelvis region of the occupant 220.

In the present embodiment, the first chamber 212 and the second chamber 214 have a width W4, which is substantially ½ of the distance D1, during inflation and deployment. However, the present invention is not limited to such a configuration, and the width W4 may be increased or decreased freely as long as the space between the seats can be filled in conjunction with the second cushion 206. In the present embodiment in particular, as the second cushion 206 is not divided into a plurality of chambers, the width W4 of the second chamber 214 may be increased or decreased freely.

As described above, in the far side airbag apparatus 202 according to the second embodiment, the space between two seats arranged side by side in the vehicle width direction is filled by two cushions (the first cushion 204 and the second cushion 206). For this reason, when the occupant 210 in the front passenger seat 108 shown in FIG. 4 leans against the first cushion 204 due to a side collision from the far side (the left side in FIG. 4), for example, the opposite side 224 of the first cushion 204 is supported by the side surface 226 of the second cushion 206. Accordingly, an amount of movement of the first cushion 204 is suppressed in comparison to the case shown in FIG. 2, i.e. where there is only the one cushion 120, and the occupant is prevented from collapsing excessively towards the far side.

In the present embodiment, the first cushion 204 has two chambers, that is, the first chamber 212 and the second chamber 214, such that the head of the occupant 210 can be restrained, however, the second cushion 206 may also be set to the same configuration such that the head of the occupant 220 can also be restrained. Alternatively, the first cushion 204 may also be set to a configuration which includes only the first chamber 212, such that only the respective pelvis regions of the occupants 210 and 220 are restrained.

Figure 5:
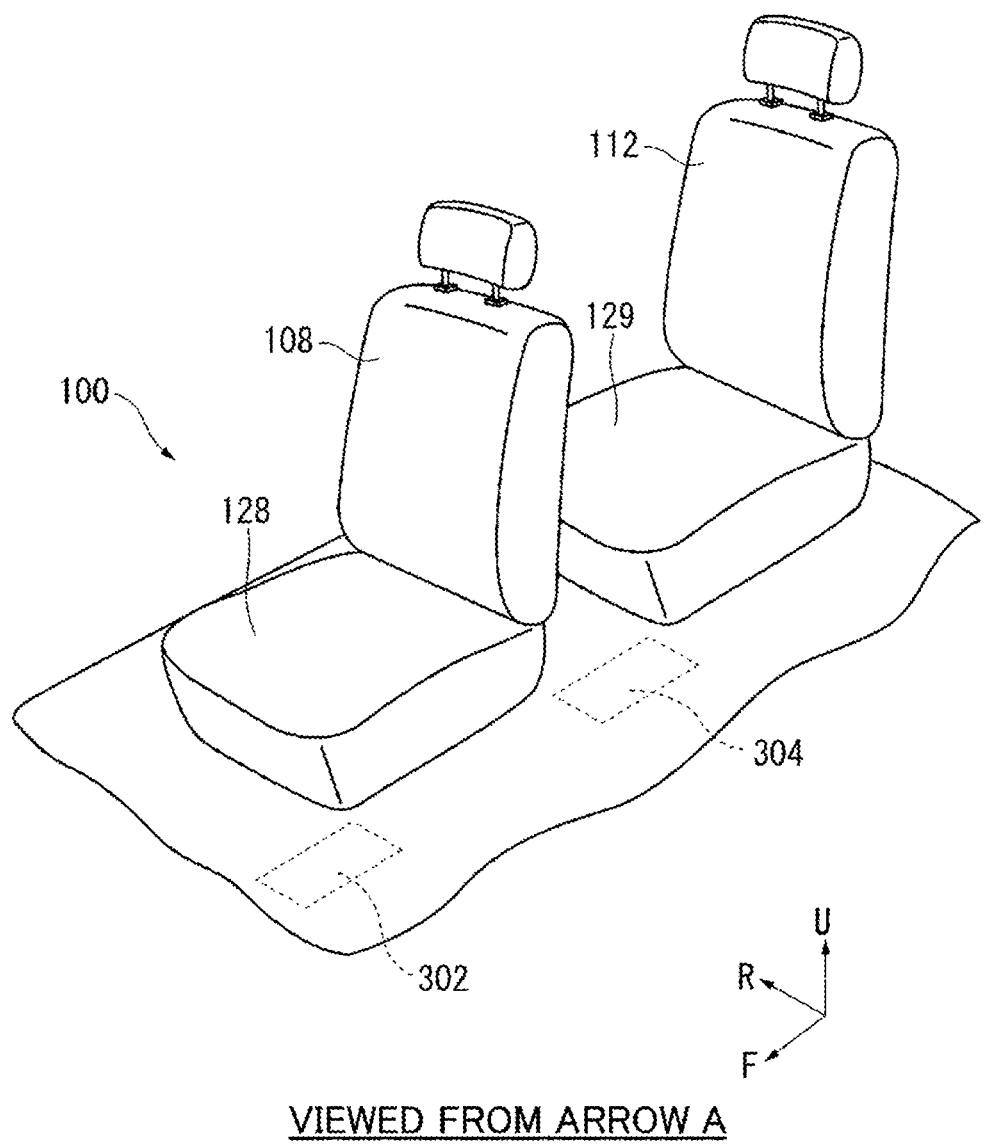
FIG. 5 is a view taken from the arrow A shown in FIG. 1.

FIG. 5 is a view taken from the arrow A shown in FIG. 1. In FIG. 5, the front passenger seat 108 and the second rear seat 112 shown in FIG. 1 are viewed from an obliquely forward direction. Airbag apparatuses 302 and 304 according to a third embodiment of the airbag apparatus according to the present invention will be described with reference to FIG. 5. Note that, in the drawings below, elements similar to those shown in FIG. 1 to FIG. 3 will be denoted by the same reference numerals, and description thereof will be omitted.

Figure 6:
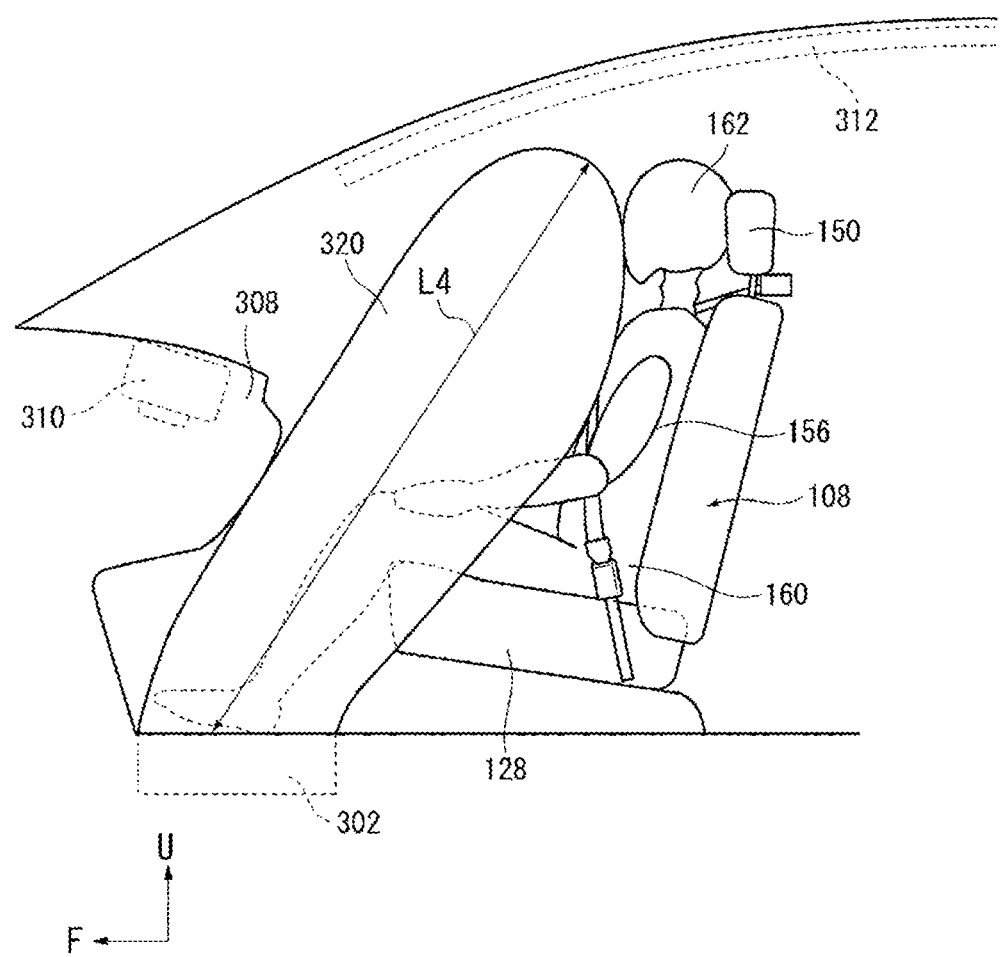
FIG. 6 is a diagram illustrating a state in which the airbag.

As indicated by the dotted lines shown in FIG. 5, the airbag apparatuses 302 and 304 are respectively embedded under the floor obliquely forward of the seat cushion 128 of the front passenger seat 108 and obliquely forward of the seat cushion 129 of the second rear seat 112 on a vehicle outer side thereof (door side). Accordingly, the main portion or all of a cushion 320 of the airbag apparatus 302 given as a representation and illustrated in FIG. 6 is embedded under the floor. Note that, although not shown, the airbag apparatuses 302 and 304 may also be provided so that at least a portion thereof projects upward from the floor of the vehicle cabin 100.

As the airbag apparatuses 302 and 304 have the same configuration and operation, the configuration and operation of the airbag apparatus 302 will be described below as a representation. FIG. 6 is a diagram illustrating a state in which the airbag apparatus 302 shown in FIG. 5 is inflated and deployed. FIG. 6 illustrates the state of the front passenger seat 108 shown in FIG. 5 as viewed from a vehicle outer side.

As illustrated in FIG. 6, the airbag apparatus 302 according to the third embodiment of the present invention inflates and deploys during a collision in which a force that causes the occupant 156 to move in an obliquely forward direction acts on the vehicle. Such a collision occurs, for example, when an obliquely front portion of the vehicle is impacted. In the present embodiment, as illustrated in FIG. 6, the airbag apparatus 302 includes one cushion 320 and, during a collision in which a force that causes the occupant 156 to move in an obliquely forward direction acts on the vehicle, the cushion 320 inflates and deploys obliquely upward from the floor. As illustrated in FIG. 6, the cushion 320 has an elliptical shape and is not partitioned into chambers. However, the present invention is not limited to such a configuration, and the cushion 320 may also be partitioned into a plurality of chambers as in, for example, the cushion 120 of the far side airbag apparatus 112 according to the first embodiment.

In the present embodiment illustrated in FIG. 6, the airbag apparatus 302 inflates and deploys obliquely forward of the seat cushion 128 on the vehicle outer side (door side) thereof. As a result, movement in an obliquely forward direction of the occupant 156 is restrained during a collision in which a force that causes the occupant 156 to move in the obliquely forward direction is exerted. In particular, when an airbag apparatus 310 installed in a front portion of the vehicle such as a dashboard 308 and a curtain airbag apparatus 312 installed in a side portion of the vehicle such as a side rail are respectively inflated and deployed, the space between the respective cushions thereof can be filled with the cushion 320 during a collision. As a result, the occupant 156 can be prevented from slipping through the space between the airbag apparatus 310 in a front portion of the vehicle and the curtain airbag apparatus 312 in a side portion of the vehicle.

Further, as illustrated in FIG. 5, by also embedding the airbag apparatus 304 obliquely forward of the second rear seat 112 on the vehicle outer side thereof, movement of an occupant (not shown) seated in the second rear seat 112 in an obliquely forward direction towards the vehicle outer side can be suppressed. As a result, the occupant in the second rear seat 112 can be prevented from colliding with, for example, the shoulder of the front passenger seat 108. Note that, although not shown, such an airbag apparatus can also be provided obliquely forward of the driver seat 106 and the first rear seat 110 (FIG. 1) on the vehicle outer side thereof.

In FIG. 6, the cushion 320 has a height that reaches a height equal to that of the head 162 of the occupant 156 seated in the front passenger seat 108 during inflation and deployment. Specifically, when inflated and deployed, the cushion 320 has a vertical dimension L4 so as to reach a height at least equal to that of the headrest 150 of the seat 108. The cushion 320 has, therefore, a height that reaches a height equal to that of the head 162 of the occupant 156 and, during a collision in which a force that causes the occupant 156 to move in an obliquely forward direction is exerted, movement of the occupant in the obliquely forward direction can be sufficiently restrained. Further, during a collision, the space between the airbag apparatus 310 in a front portion of the vehicle and the curtain airbag apparatus 312 in a side portion of the vehicle can be sufficiently filled with the cushion 320. Note that the present invention is not limited to such a configuration, and that the cushion 320 may also be configured to reach a height at least equal to that of the pelvis region 160 of the occupant 156 seated in the front passenger seat 108 when inflated and deployed.

Figure 7:
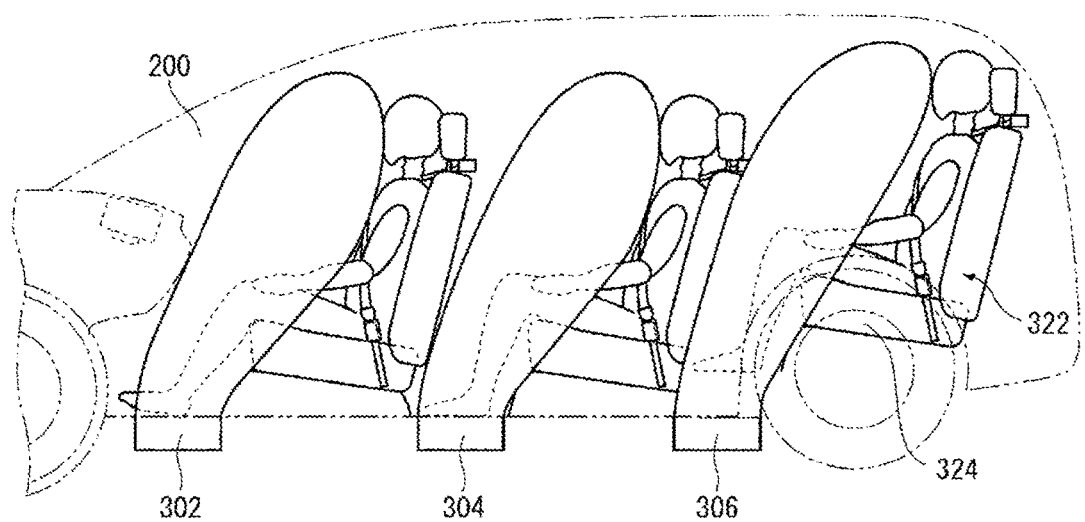
FIG. 7 is a diagram illustrating a vehicle cabin of a different vehicle in which the airbag apparatus shown in FIG. 5 is implemented.

FIG. 7 is a diagram illustrating a vehicle cabin 200 of another vehicle in which the airbag apparatuses 302 and 304 shown in FIG. 5 are implemented. In FIG. 7, elements which are similar to those shown in FIG. 5 and FIG. 6 are denoted by the same reference numerals, and description thereof will be omitted. As illustrated in FIG. 7, the airbag apparatuses 302 and 304 can also be implemented in a vehicle having three rows of seats in the vehicle longitudinal direction. In FIG. 7, an airbag apparatus 306 which is similar to the airbag apparatuses 302 and 304 is embedded beneath the floor obliquely forward of the seat cushion 324 of the third rear seat 322, which is a third row seat, on a vehicle outer side thereof. Note that, although not illustrated in FIG. 7, when a passage exists between the third row seats, a far side airbag apparatus similar to the far side airbag apparatus 102 and the far side airbag apparatus 202 may also be installed in the passage.

Although the preferred embodiments of the present invention have been described above with reference to the accompanying drawings, the embodiments described above are preferred examples of the present invention. Accordingly, other embodiments can also be implemented or executed by various methods. Moreover, unless specifically indicated otherwise in the description of the present application, the present invention is not limited to the shape, size, configuration arrangement, etc. of the detailed components shown in the accompanying drawings. Further, the expressions and terms used in the description of the present application are for the purpose of explanation and, unless specifically indicated otherwise, are not limited thereto.

The present invention can be used as an airbag apparatus provided with a cushion that inflates and deploys so as to protect an occupant when an impact occurs in a vehicle due to an accidental collision or the like.

While the above description constitutes the preferred embodiment of the present invention, it will be appreciated that the invention is susceptible to modification, variation and change without departing from the proper scope and fair meaning of the accompanying claims.

The invention claimed is:

1. An airbag apparatus for a vehicle having a floor in a vehicle cabin comprising;
   a cushion embedded in the floor of the vehicle cabin and reaching a height at least equal to that of a pelvis region of a representative occupant seated in a seat from a space on a passage during inflation and deployment of the cushion,
   wherein the space on the passage defined between each seat cushion of two seats arranged side by side in a vehicle width direction of the vehicle cabin is filled with the cushion.

2. The airbag apparatus according to claim 1, further comprising;
   the cushion reaches a height equal to that of a head of the representative occupant seated in either one of the two seats, and includes:
      a first chamber for restraining the pelvis region of the representative occupant; and a second chamber which is formed above the first chamber for restraining the head of the representative occupant.

3. The airbag apparatus according to claim 1, further comprising;
the cushion inflates and deploys so as to be sandwiched between the respective seat cushions of the two seats.

4. The airbag apparatus according to claim 1, further comprising;
the cushion provided as a first cushion for the representative occupant seated in one of the two seats during the inflation and deployment of the cushion; and
the cushion provided as a second cushion for the representative occupant seated in the other of the two seats during inflation and deployment of the cushion.

5. The airbag apparatus according to claim 4, further comprising;
at least one of the first cushion and the second cushion includes:
a first chamber for restraining the pelvis region of the representative occupant; and
a second chamber which is formed above the first chamber for restraining the head of the representative occupant, and has a height that reaches a height equal to that of a head of the representative occupant seated in at least one of the two seats.

6. The airbag apparatus according to claim 4, further comprising;
the first cushion and the second cushion inflate and deploy so as to be sandwiched between the respective seat cushions of the two seats.

7. The airbag apparatus according to claim 6, further comprising;
a pair of the first cushion and the second cushion are provided between the seats with each of the first cushion and the second cushion having a width about one half of the separation between the two seats.

8. An airbag apparatus for a vehicle having a floor in a vehicle cabin, comprising:
a cushion embedded in the floor of the vehicle cabin and reaching a height at least equal to that of a pelvis region of a representative occupant seated in a seat during inflation and deployment of the cushion,
wherein the airbag apparatus deploys on a vehicle outer side and obliquely forward one of two of the seats arranged side by side in a vehicle width direction of the cabin, and inflates and deploys during a collision in which a force that causes the representative occupant to move in an obliquely forward direction is exerted on the vehicle.

9. The airbag apparatus according to claim 8, further comprising;
the cushion has a height that reaches a height equal to that of a head of the representative occupant seated in one of the two seats.

\* \* \* \* \*